UNITED STATES PATENT OFFICE.

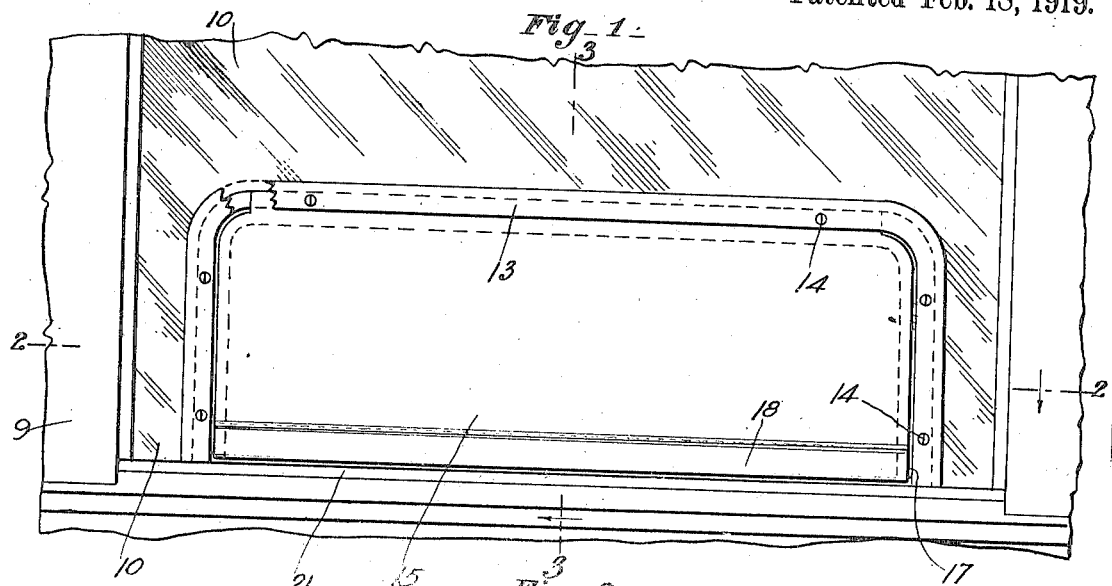

WALTER VERNON DAVIS, OF MOUNT VERNON, NEW YORK.

AUTOMOBILE-WINDOW.

1,294,879.  Specification of Letters Patent.  Patented Feb. 18, 1919.

Application filed January 25, 1918. Serial No. 213,701.

*To all whom it may concern:*

Be it known that I, WALTER V. DAVIS, a citizen of the United States, and a resident of Mount Vernon, in the county of Westchester and State of New York, have invented a new and Improved Automobile-Window, of which the following is a full, clear, and exact description.

Among the principal objects which the present invention has in view are: to afford opportunity for hand-signaling while driving a closed body automobile; to prevent the admission of rain or snow to the interior of a car having an opening in the side window thereof for signaling purposes; to avoid the admission of moisture deposited on the window to the interior of said car; and to provide means for hanging or suspending a weather curtain.

*Drawings.*

Figure 1 is a side view of a transparent side panel and curtain for a car, constructed and arranged in accordance with the present invention, a portion of the opening frame being cut away to show the manner of hanging the curtain;

Fig. 2 is a horizontal section taken as on the line 2—2 in Fig. 1;

Fig. 3 is a vertical section on an enlarged scale, the section being taken as on the line 3—3 in Fig. 1;

Fig. 4 is a perspective view showing a window formed and equipped in conformity with the present invention.

*Description.*

As seen in the drawings, an inclosed car body 9 is provided with a transparent panel 10 having at the lower end edge thereof, a hand or arm opening 11. The opening 11 is formed to afford a passage for the hand and arm of the driver of an automobile whose seat is located adjacent the panel 10. Preferably the edge of the opening 11 is covered with a frame 12. The frame 12 is rabbeted as shown best in Fig. 3 of the drawings, to extend partially through the opening 11 in the panel 10. At the outer side, a covering strip 13 is secured to the frame 12, by means of screws 14 or other suitable fastening devices. The framed opening thus formed is normally closed in service by a curtain 15. The curtain 15 is held in closed position by clips 16. The clips 16 are made from spring metal and are rigidly secured to a weight bar 17 which is mounted in a loop seam 18 in the lower edge of the curtain 15. The clips 16 resiliently engage ridges 19 in the side of the frame 12. A pull strap 20 is attached to the curtain 15 for drawing the curtain into closed position against the weather strip 21, which is attached to the window frame 22 in which the panel 10 is mounted.

The frame 22 is of the slidable type and is held in active position by means of a loop 23 which engages a ridge 24 formed in the body 9 adjacent the window opening.

The curtain 15 is held between the frame 12 and covering strip 13 at the top of the frame formed thereby. Preferably the curtain is held in this position by the screws 14 passing through the material of which the curtain is formed.

While the frame herein shown and described is preferably composed of wood fiber or other similar material, it should be understood that a channeled sheet metal frame may be employed and that the curtain 15 may be attached at the top of the said frame in any suitable manner.

With a curtain thus installed, it is obvious that when the chauffeur desires to give a hand signal to the following traffic, this is readily accomplished by pressing his hand upon the lower portion of the curtain 15 with sufficient force to release the clips 16 from their engagement with the ridges 19. The curtain will then swing outward, permitting the hand of the chauffeur to be extended to view by the drivers of the following vehicles. When his hand is withdrawn, the curtain 15 falls into place and the driver then engaging the pull strap 20 may cause the clips 16 to reëngage the ridges 19, thus securing the curtain firmly in position.

*Claims.*

1. An automobile window comprising a transparent panel having an opening therein adjacent the lower edge thereof, said opening being adapted to pass a human hand and arm; a frame for said opening; a flexible curtain permanently mounted in said frame for closing the opening thereof; and spring yielding means for holding said curtain in service relation.

2. An automobile window comprising a transparent panel having an opening therein adjacent the lower edge thereof, said opening being adapted to pass a human hand and arm; a frame for said opening; a flexible curtain permanently mounted in said frame for closing the opening thereof; a plurality of spring clip members attached to said curtain and ridges formed in said frame for engaging said clip members for yieldingly holding said curtain in service relation; and means attached to said curtain for unyieldingly holding the same in service relation.

3. An automobile window comprising a transparent panel having an opening therein adjacent the lower edge thereof, said opening being adapted to pass a human hand and arm; a frame for said opening; a flexible curtain permanently mounted in said frame for closing the opening thereof; a weight bar mounted on said curtain for holding said curtain normally in service relation to said window opening; a plurality of spring clips mounted on said bar adjacent the extremities thereof; and a plurality of reach members mounted on said frame for engaging said spring members for holding said curtain yieldingly in service relation.

WALTER VERNON DAVIS.